(12) United States Patent
Kobayashi

(10) Patent No.: US 12,715,516 B2
(45) Date of Patent: Aug. 25, 2026

(54) OFF-ROAD VEHICLE

(71) Applicant: KAWASAKI MOTORS, LTD., Akashi (JP)

(72) Inventor: Minoru Kobayashi, Akashi (JP)

(73) Assignee: Kawasaki Motors, LTD., Akashi (JP)

( * ) Notice: Subject to any disclaimer, the term of this patent is extended or adjusted under 35 U.S.C. 154(b) by 0 days.

(21) Appl. No.: 18/887,239

(22) Filed: Sep. 17, 2024

(65) Prior Publication Data

US 2026/0077816 A1 Mar. 19, 2026

(51) Int. Cl.
*B62D 21/18* (2006.01)

(52) U.S. Cl.
CPC .................................. *B62D 21/183* (2013.01)

(58) Field of Classification Search
CPC .................................................... B62D 21/183
See application file for complete search history.

(56) References Cited

U.S. PATENT DOCUMENTS

| | | | | |
|---|---|---|---|---|
| 2,463,310 | A * | 3/1949 | Probst | B62D 21/183 280/124.128 |
| 5,495,905 | A * | 3/1996 | Fini, Jr. | B60G 9/00 180/382 |
| 9,764,767 | B2 * | 9/2017 | Proulx | B60N 2/3045 |
| 10,023,234 | B2 * | 7/2018 | Kariniemi | B62D 23/005 |
| 11,358,412 | B2 * | 6/2022 | Stephan | B60B 25/006 |
| 11,866,095 | B2 * | 1/2024 | Harmon | B62D 21/12 |
| 2004/0195028 | A1 * | 10/2004 | Izumi | B60K 23/08 180/249 |
| 2010/0314191 | A1 * | 12/2010 | Deckard | B60N 2/38 180/312 |
| 2013/0175779 | A1 * | 7/2013 | Kvien | B62D 21/183 280/124.15 |
| 2014/0103627 | A1 * | 4/2014 | Deckard | B60N 2/58 411/362 |
| 2014/0353956 | A1 * | 12/2014 | Bjerketvedt | B60N 2/24 296/64 |
| 2015/0183318 | A1 * | 7/2015 | Bandy | B60K 5/1216 180/233 |

(Continued)

FOREIGN PATENT DOCUMENTS

| | | | | | |
|---|---|---|---|---|---|
| AU | 2014274217 | A1 * | 10/2015 | B60J 5/0487 |
| CN | 100402366 | C * | 7/2008 | B60L 50/66 |
| CN | 104608825 | A * | 5/2015 | B62D 21/183 |

*Primary Examiner* — Karen Beck
(74) *Attorney, Agent, or Firm* — Muncy, Geissler, Olds & Lowe, P.C.

(57) ABSTRACT

An off-road vehicle includes: a mainframe that supports a motor; a front wheel; a rear wheel; a front drive shaft that transfers rotation of the motor to the front wheel; and a rear drive shaft that transfers rotation of the motor to the rear wheel. The mainframe includes a bottom frame that extends in a fore-aft direction. The bottom frame includes an intermediate portion that is located between the front wheel and the rear wheel, a front portion that extends forward from the intermediate portion, and a rear portion that extends rearward from the intermediate portion. The front portion is lowered as the front portion extends forward, and the rear portion is lowered as the rear portion extends rearward. The front drive shaft is lowered as the front drive shaft extends forward, and the rear drive shaft is lowered as the rear drive shaft extends rearward.

17 Claims, 4 Drawing Sheets

(56) References Cited

U.S. PATENT DOCUMENTS

2015/0367891 A1* 12/2015 Deschamps .......... B62D 21/183
280/781
2016/0059895 A1* 3/2016 Kariniemi .............. B62D 21/11
280/781
2017/0029036 A1* 2/2017 Proulx ................... B60N 2/305
2017/0050678 A1* 2/2017 Kariniemi ............ B62D 23/005
2017/0096174 A1* 4/2017 Kariniemi ............ B62D 23/005
2018/0072348 A1* 3/2018 Hisada ................. B62D 21/183
2019/0300064 A1* 10/2019 Hisamura ............ B62D 23/005
2022/0348259 A1* 11/2022 Harmon ............... B62D 65/024

* cited by examiner

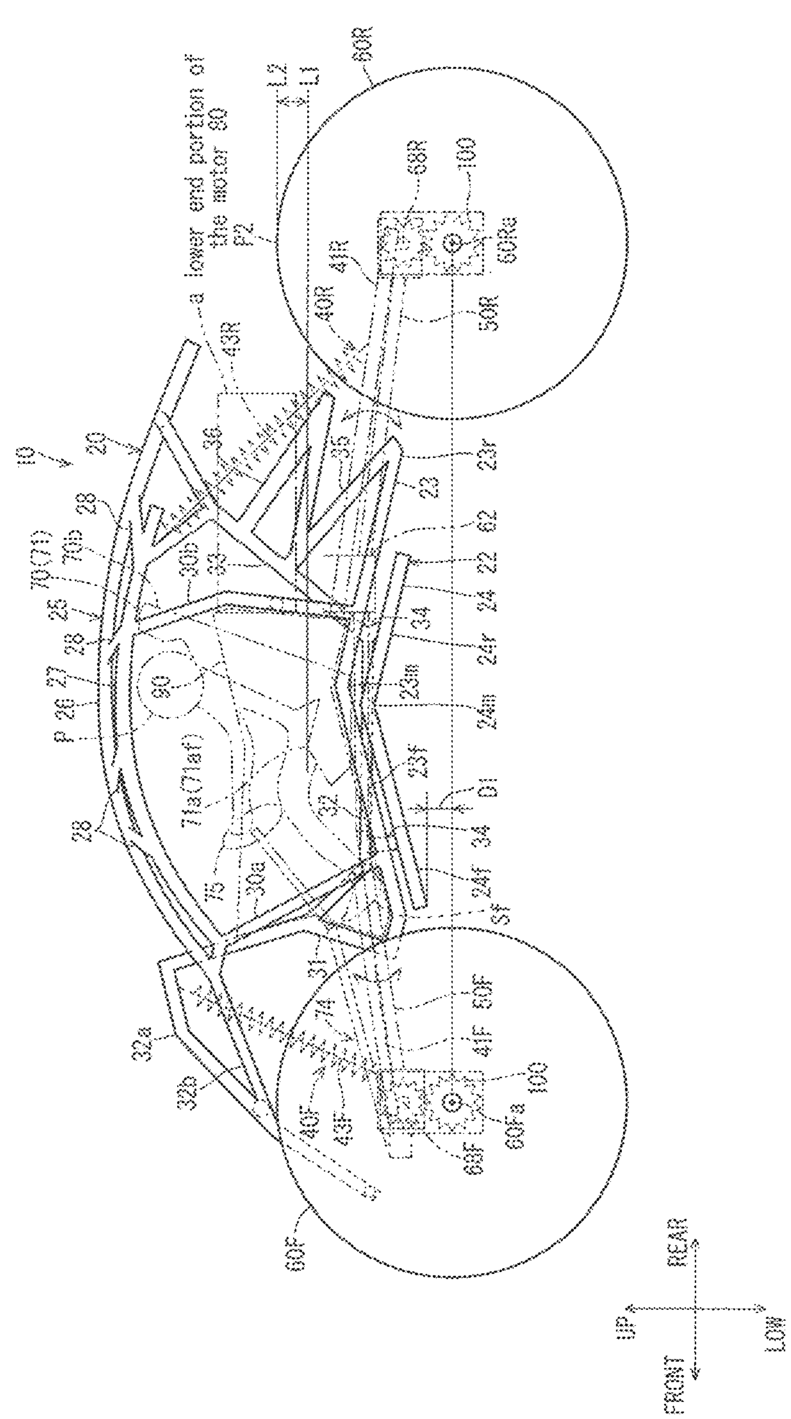
F I G . 1

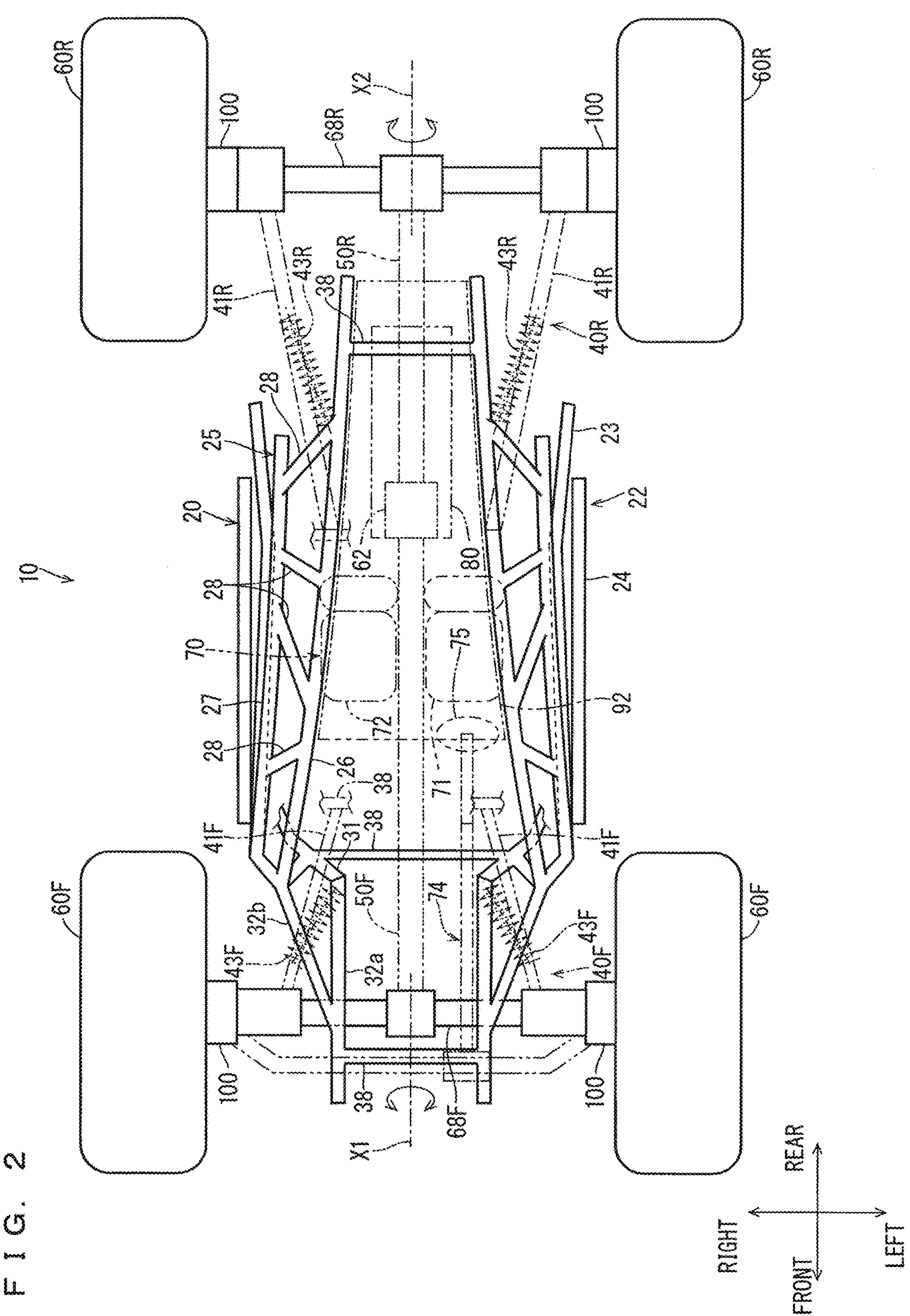
F I G. 2
10
20
22
23
24
25
26
27
28
31
32a
32b
38
40F
40R
41F
41R
43F
43R
50F
50R
60F
60R
62
68F
68R
70
71
72
74
75
80
92
100
X1
X2
REAR
FRONT
RIGHT
LEFT F I G. 3
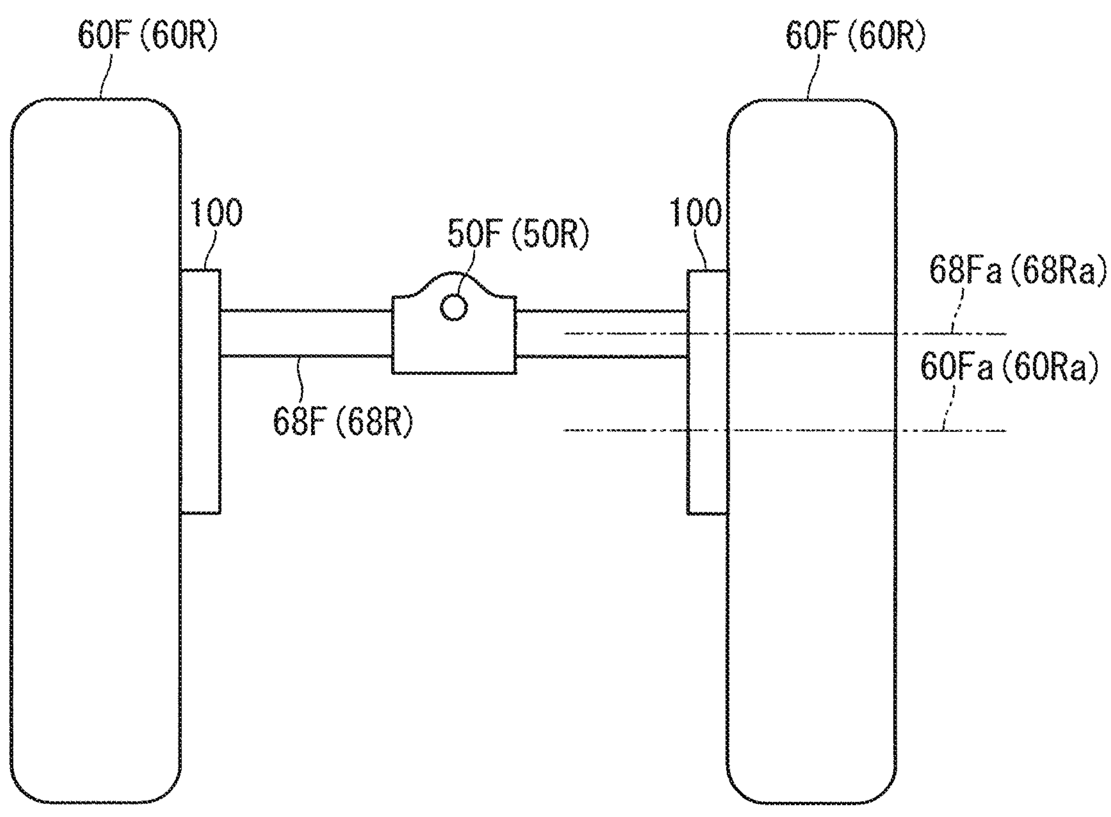

OFF-ROAD VEHICLE

TECHNICAL FIELD

The present disclosure relates to off-road vehicles.

BACKGROUND ART

US 2016/0059895 A1 discloses an all-terrain four-wheel vehicle including an arcuate frame.

SUMMARY

An off-road vehicle is an off-road vehicle including: a mainframe that supports a motor; a front wheel; a rear wheel; a front suspension that supports the front wheel relative to the mainframe; a rear suspension that supports the rear wheel relative to the mainframe; a front drive shaft that transfers rotation of the motor to the front wheel; and a rear drive shaft that transfers rotation of the motor to the rear wheel, wherein the mainframe includes a bottom frame that extends in a fore-aft direction, the bottom frame includes an intermediate portion that is located between the front wheel and the rear wheel, a front portion that extends forward from the intermediate portion, and a rear portion that extends rearward from the intermediate portion, the front portion is lowered as the front portion extends forward, and the rear portion is lowered as the rear portion extends rearward.

BRIEF DESCRIPTION OF DRAWINGS

FIG. 1 is a side view illustrating an off-road vehicle according to an embodiment.

FIG. 2 is a plan view illustrating the off-road vehicle.

FIG. 3 is a schematic view illustrating portal axles.

DESCRIPTION OF THE PREFERRED EMBODIMENTS

Figure 4:
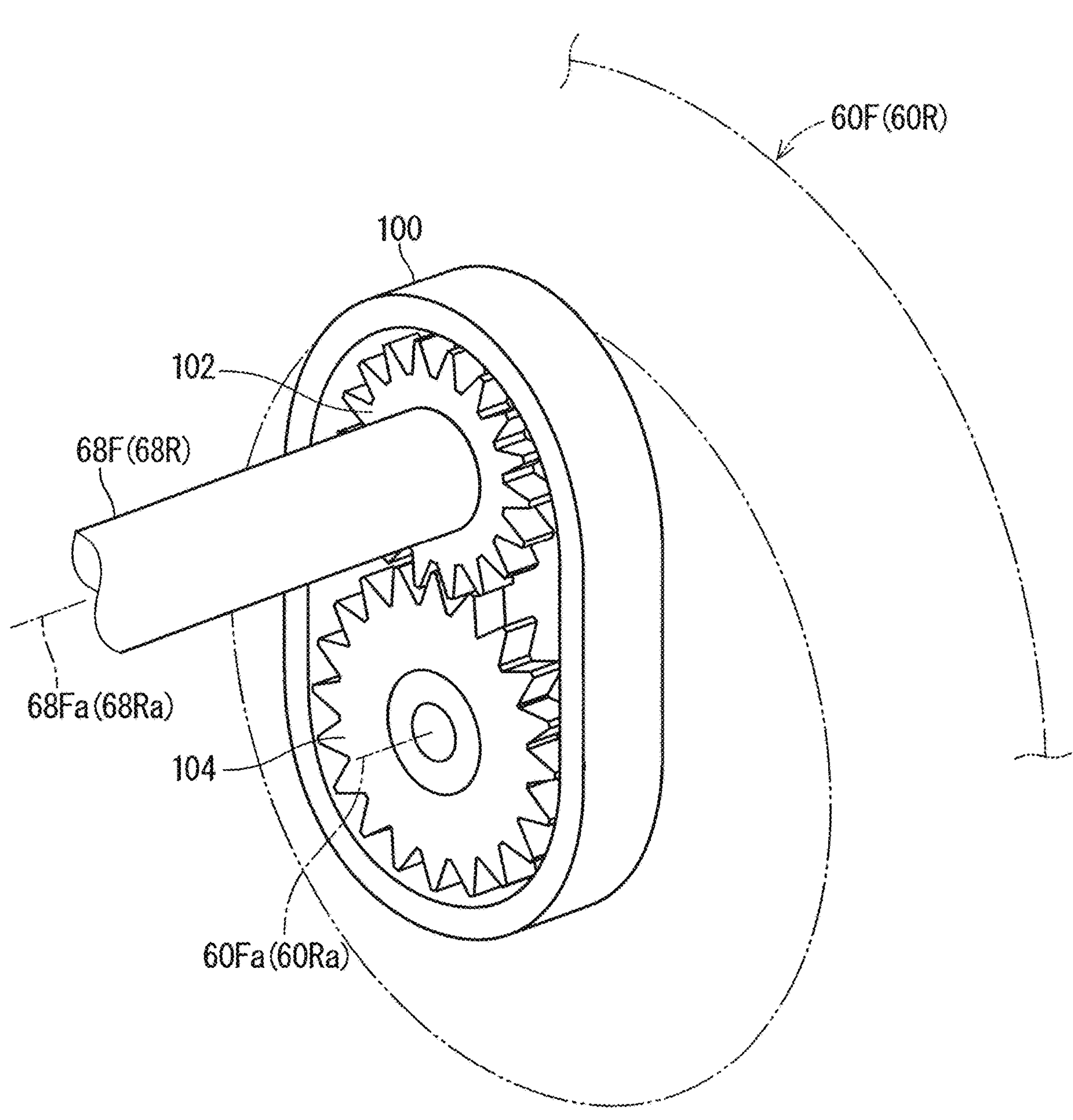
FIG. 4 is a schematic perspective view illustrating a portal axle.

An off-road vehicle according to an embodiment will be described below. FIG. 1 is a side view illustrating an off-road vehicle 10. FIG. 2 is a plan view illustrating the off-road vehicle 10. FIG. 2 mainly illustrates a bottom frame 22 and a top frame 25 of a mainframe 20.

When upward, downward, forward, rearward, leftward, and rightward directions are referred to in description made below, these directions are defined as follows. First, a side on which front wheels 60F and rear wheels 60R of the off-road vehicle 10 are in contact with a road surface is a lower side, and the opposite side is an upper side. A direction of travel when the off-road vehicle 10 travels is the forward direction, and the opposite direction is the rearward direction. Left and right relative to a driver P with the driver P riding in the off-road vehicle 10 are left and right of the off-road vehicle 10. A width direction refers to leftward and rightward cross-car directions.

The off-road vehicle 10 is a vehicle that can travel on rough terrain, such as a rocky, grassy, or sandy place. The off-road vehicle 10 includes the mainframe 20, the front wheels 60F, the rear wheels 60R, a front suspension 40F, a rear suspension 40R, a front drive shaft 50F, and a rear drive shaft 50R.

The mainframe 20 is a frame that supports components of the off-road vehicle 10. For example, the mainframe 20 includes stereoscopically combined metal pipes. The metal pipes may be welded, bent, and fitted together to be stereoscopically combined. The mainframe may include a portion formed of a material other than metal, such as a resin portion. The mainframe may include a plate-like portion, such as a metal plate portion.

A motor 80 is supported by the mainframe 20. The motor 80 is an apparatus that produces a rotational drive force for travel of the off-road vehicle 10. The motor 80 may be an internal combustion engine or may be an electric motor, for example.

The front wheels 60F and the rear wheels 60R are wheels that rollably support the mainframe 20 on the ground for travel. The front wheels 60F are located forward of the rear wheels 60R. In the present embodiment, the off-road vehicle 10 includes two front wheels 60F and two rear wheels 60R. The number of front wheels 60F and the number of rear wheels 60R are not particularly limited. For example, the number of front wheels 60F may be one, and the number of rear wheels 60R may be one.

The front suspension 40F is an apparatus that supports the front wheels 60F relative to the mainframe 20. The rear suspension 40R is an apparatus that supports the rear wheels 60R relative to the mainframe 20. The front suspension 40F and the rear suspension 40R serve as buffer apparatuses that transmit unevenness of the ground for travel on which the front wheels 60F and the rear wheels 60R roll as little as possible.

The front drive shaft 50F is a shaft that transfers rotation of the motor 80 to the front wheels 60F. The rear drive shaft 50R is a shaft that transfers rotation of the motor 80 to the rear wheels 60R. That is to say, the off-road vehicle 10 according to the present embodiment is a vehicle in which a drive force for travel is transferred to both the front wheels 60F and the rear wheels 60R. In the present embodiment, the off-road vehicle 10 is a four-wheel-drive vehicle.

A gear shift mechanism that changes a rotational speed of the motor 80 by a combination of gears may be interposed between the motor 80 and each of the front drive shaft 50F and the rear drive shaft 50R.

The off-road vehicle 10 includes a seat 70. The seat 70 includes a driver's seat 71 on which the driver P is seated. The seat 70 may include a passenger's seat 72 on which a passenger is seated. In the present embodiment, the seat 70 includes the driver's seat 71 and the passenger's seat 72 arranged side by side. The seat may be a seat for one occupant. The seat may include a front seat and a rear seat rearward of the front seat.

The driver's seat 71 includes a seat portion 71*a* and a backrest 71*b*. The backrest 70*b* rises from a rear side of the seat portion 71*a*. The seat 70 may directly be supported by the mainframe 20 or may indirectly be supported by the mainframe 20. For example, a plate-like floor may be supported by an intermediate portion in a fore-aft direction of the mainframe 20, and the seat 70 may be supported on the floor.

The off-road vehicle 10 includes a steering system 74. The steering system 74 is a system to change the direction of travel of the off-road vehicle 10. In the present embodiment, the steering system 74 is a system that changes orientations of the front wheels 60F.

For example, the steering system 74 includes a steering wheel, a steering column, a rack and pinion mechanism, and a tie rod.

The steering wheel 75 is rotatably supported by the steering column at a position forward of the driver's seat 71. The steering wheel 75 may be annular. The steering wheel

75 is not required to be completely annular. For example, the steering wheel 75 may only include left and right grips.

Rotation of the steering wheel 75 is transferred to the left and right front wheels 60F via the steering column, the rack and pinion mechanism, and the tie rod. Rotation of the steering wheel 75 is transferred as a force to orient the left and right front wheels 60F to the left or to the right. The driver P thus rotates the steering wheel 75 to orient the left and right front wheels 60F to the left or to the right to change the direction of travel of the off-road vehicle 10.

The change in orientation of the front wheels 60F in response to operation of the steering wheel 75 may not be achieved by the above-mentioned configuration. For example, the orientation of the front wheels 60F may be changed by driving of the electric motor in response to operation of the steering wheel 75.

<Mainframe 20>

The mainframe 20 will more specifically be described.

The mainframe 20 includes the bottom frame 22. The bottom frame 22 is a frame that extends in the fore-aft direction. In the present embodiment, the bottom frame 22 extends in the fore-aft direction between a rotational axis 60Fa of the front wheels 60F and a rotational axis 60Ra of the rear wheels 60R in the fore-aft direction. The bottom frame 22 is a portion of the mainframe 20 that is located on a lower side.

The bottom frame 22 includes intermediate portions **23*m* and 24*m*, front portions 23*f* and 24*f*, and rear portions 23*r* and 24*r*. The intermediate portions 23*m* and 24*m* are located between the front wheels 60F and the rear wheels 60R in the fore-aft direction. The front portions 23*f* and 24*f* are portions that extend forward from the intermediate portions 23*m* and 24*m*. The rear portions 23*r* and 24*r* are portions that extend rearward from the intermediate portions 23*m* and 24*m*. The front portions 23*f* and 24*f* are lowered and approach a contact surface with which the front wheels are in contact as the front portions 23*f* and 24*f* extend forward. The rear portions 23*r* and 24*r* are lowered and approach a contact surface with which the rear wheels are in contact as the rear portions 23*r* and 24*r*** extend rearward.

More specifically, the bottom frame 22 includes first bottom frame portions 23 and second bottom frame portions 24 on opposite sides in a cross-car direction. The first bottom frame portions 23 and the second bottom frame portions 24 may symmetrically be arranged with a mid-plane in the cross-car direction as a plane of symmetry.

The first bottom frame portions 23 and the second bottom frame portions 24 each extend in the fore-aft direction. The second bottom frame portions 24 are located outside the first bottom frame portions 23 in the cross-car direction. The second bottom frame portions 24 are located below the first bottom frame portions 23. That is to say, the second bottom frame portions 24 are located outside the first bottom frame portions 23 in the cross-car direction and below the first bottom frame portions 23 in a vertical direction when a cross section perpendicular to the fore-aft direction is observed at each position along the fore-aft direction.

The first bottom frame portions 23 include the intermediate portions **23*m*, the front portions 23*f*, and the rear portions 23*r*. In the present embodiment, the front portions 23*f* and the rear portions 23*r* each extend linearly. The intermediate portions 23*m* are bent to be convex upward between the front portions 23*f* and the rear portions 23*r*. The intermediate portions 23*m*** may be bent at an obtuse angle or may be bent while being curved, for example.

The second bottom frame portions 24 include the intermediate portions **24*m*, the front portions 24*f*, and the rear portions 24*r*. In the present embodiment, the front portions 24*f* and the rear portions 24*r* each extend linearly. The intermediate portions 24*m* are bent to be convex upward between the front portions 24*f* and the rear portions 24*r*. The intermediate portions 24*m*** may be bent at an obtuse angle or may be bent while being curved, for example.

The intermediate portions **23*m* and 24*m* may be bent at the same angle or may be bent at different angles. In the present embodiment, the intermediate portions 23*m* and 24*m* are bent at the same angle. The front portions 23*f* and the front portions 24*f* are parallel, and the rear portions 23*r* and the rear portions 24*r*** are parallel.

The intermediate portions **23*m* and 24*m* may be located at the same position or may be located at different positions in the fore-aft direction. In the present embodiment, the intermediate portions 24*m* are located forward of the intermediate portions 23*m*** in the fore-aft direction.

The intermediate portions **23*m* and 24*m* are preferably located closer to the middle between the front rotational axis 60Fa and the rear rotational axis 60Ra in the fore-aft direction. For example, the intermediate portions 23*m* and 24*m* may be located within 10% and preferably within 5% of a distance between the rotational axis 60Fa and the rotational axis 60Ra from a middle position between the rotational axis 60Fa and the rotational axis 60**Ra in the fore-aft direction.

When the off-road vehicle 10 is viewed from a side, a lowermost portion between the front wheels 60F and the rear wheels 60R in the fore-aft direction is the bottom frame 22. More specifically, the lowermost portion is the second bottom frame portions 24.

The front portions **23*f* and 24*f* each have any length, and the rear portions 23*r* and 24*r* each have any length. For example, in side view, front ends of the front portions 23*f* and 24*f* extend forward of the seat 70 and may further extend downward of a space around the feet of an occupant seated on the seat 70. Rear ends of the rear portions 23*r* and 24*r* may extend rearward of the seat 70. The rear portions 23*r* may extend rearward of the rear portions 24*r***.

A portion of the mainframe 20 excluding the first bottom frame portions 23 and the second bottom frame portions 24 is preferably located above a lowermost end frame portion as a lowermost portion of the bottom frame 22 and above the second bottom frame portions 24 in the present embodiment. For example, the drive shafts 50F and 50R are preferably located above the lowermost end frame portion. In the present embodiment, with the vehicle being disposed on a flat road surface as illustrated in FIG. 1, a line connecting the rotational axes of the front wheels and the rear wheels is located below the lowermost end frame portion.

The mainframe 20 includes the top frame 25. When viewed from a side, a space for an occupant seated on the seat 70 is only required to be formed between the bottom frame 22 and the top frame 25.

The top frame 25 includes first top frames 26 and second top frames 27 on opposite sides in the cross-car direction. The first top frames 26 and the second top frames 27 may symmetrically be arranged with the mid-plane in the cross-car direction as a plane of symmetry.

The first top frames 26 and the second top frames 27 each extend in the fore-aft direction. The second top frames 27 are located outside the first top frames 26 in the cross-car direction. The second top frames 27 are lower than the first top frames 26.

When viewed from a front, the left and right second top frames 27 are located outside in the cross-car direction, and the first top frames 26 are located inside the left and right second top frames 27 in the cross-car direction and above the left and right second top frames 27. That is to say, the top frame 25 is formed to have a lower height on the opposite sides in the cross-car direction.

The first top frames 26 and the second top frames 27 may be connected by connecting portions 28. The connecting portions 28 preferably connect the first top frames 26 and the second top frames 27 to form a truss structure.

The truss structure includes not only a structure in which components are combined to form a strict triangular shape but also a structure in which the components are combined to form a shape closer to the triangular shape than to a ladder shape. For example, a case where the first top frames 26, the second top frames 27, and the connecting portions 28 form the truss structure thus includes a case described below: A case where the connecting portions 28 between the first top frames 26 and the second top frames 27 are combined so that adjacent connecting portions 28 are inclined opposite to alternately arrange trapezoids having different magnitude relationships between an upper base and a lower base along a direction of extension of the first top frames 26.

The first top frames 26 and the second top frames 27 are each arcuate to be convex upward in side view. The first top frames 26 and the second top frames 27 may be arcuate to have the same curvature radius or may be arcuate to have different curvature radii. In the present embodiment, the first top frames 26 located on upper sides have larger curvature radii than the second top frames 27 located on lower sides in side view.

The first top frames 26 and the second top frames 27 may each have the same curvature radius or may each have different curvature radii in a longitudinal direction thereof as a whole. The first top frames 26 and the second top frames 27 may have any uppermost vertex position. For example, the vertex position may be a position where the head of the driver P seated on the seat 70 is present in the fore-aft direction.

The first top frames 26 and the second top frames 27 are preferably located at positions higher than the head of the driver P seated on the driver's seat 71. The first top frames 26 and the second top frames 27 achieve a rollover protective structure (ROPS).

A roof 92 may be assembled to the first top frames 26 and the second top frames 27. For example, the roof 92 may be assembled between the left and right first top frames 26. The roof 92 may cover the first top frames 26 and the second top frames 27 from above.

The first top frames 26 and the second top frames 27 each have any length. For example, in side view, front ends of the first top frames 26 and the second top frames 27 extend forward of the seat 70 and may extend forward of the first bottom frame portions 23 and the second bottom frame portions 24 described above. The first top frames 26 and the second top frames 27 may extend rearward of the seat 70. The first top frames 26 may extend rearward of the first bottom frame portions 23. The second top frames 27 may extend rearward of the second bottom frame portions 24. The first top frames 26 may extend rearward of the second top frames 27.

The bottom frame 22 and the top frame 25 described above are connected by other frames, pillars, or the like to form the mainframe 20 that supports the motor 80, the seat 70, the front wheels 60F, the rear wheels 60R, and the like. A space for the driver P seated on the seat 70 is surrounded by the mainframe 20.

For example, the first bottom frame portions 23 and the second top frames 27 are connected by pillar frames 30*a* and 30*b* at positions away from each other in the fore-aft direction. In the fore-aft direction, the pillar frame 30*a* is located forward of the seat 70, and the pillar frame 30*b* is located rearward of the seat portion 71*a*. The driver P can thus enter and exit the vehicle through a portion between the pillar frame 30*a* and the pillar frame 30*b*. The pillar frame 30*a* may be connected to the front ends of the first top frames 26 beyond the front ends of the second top frames 27.

Front pillars 31 protrude upward from front end portions of the first bottom frame portions 23. The front pillars 31 protrude above the first top frames 26 through a portion inside the front ends of the first top frames 26 in the cross-car direction while being bent in a zigzag manner.

Front frames 32*a* extend forward from upper ends of the front pillars 31. Auxiliary front frames 32*b* extend from the front ends of the first top frames 26 and are connected to intermediate portions of the front frames 32*a*. The left and right front frames 32*a* are located above the steering system 74 and the front drive shaft 50F between the left and right front wheels 60F. The left and right front frames 32*a* protect the steering system 74, a connecting portion that connects the front drive shaft 50F and a rigid axle 68F, and the like.

Middle bottom frames 32 are located closer to the middle in the cross-car direction than the first bottom frame portions 23 are. The middle bottom frames 32 are provided on the opposite sides in the cross-car direction.

Front ends of the middle bottom frames 32 are inclined diagonally upward and forward and are connected to the above-mentioned front pillars 31. Intermediate portions and rear end portions of the middle bottom frames 32 extend linearly along the fore-aft direction. Lowermost portions of the middle bottom frames 32 are preferably arranged at positions higher than lowermost portions of the intermediate portions 24*m* of the second bottom frame portions 24. The lowermost portions of the intermediate portions 24*m* are internal corner portions of the intermediate portions 23*m*.

Rear pillars 33 rise from rear ends of the middle bottom frames 32. The rear pillars 33 extend diagonally upward and rearward. Upper ends of the rear pillars 33 are each branched in a Y-shape and are connected to portions of the first top frames 26 closer to rear ends thereof and portions of the second top frames 27 closer to rear ends thereof.

Connecting frames 34 extend from intermediate portions in a longitudinal direction of the middle bottom frames 32 outward and diagonally downward in the cross-car direction. The number of connecting frames 34 is two or more and is herein two, and the connecting frames 34 are provided at positions away from each other in the fore-aft direction, for example. The second bottom frame portions 24 are supported on leading ends of the connecting frames 34.

A structure to support the second bottom frame portions 24 is not limited to that in the above-mentioned example, and the second bottom frame portions 24 may be supported by the first bottom frame portions 23, for example.

Connecting frames 35 extend from rear ends of the first bottom frame portions 23 diagonally upward and forward. The connecting frames 35 are connected to intermediate portions in a longitudinal direction of the rear pillars 33.

V-shaped additional frames 36 extend rearward from the intermediate portions in the longitudinal direction of the rear pillars 33.

Left and right parts of the above-mentioned mainframe 20 are connected by width direction connecting frames 38. The width direction connecting frames 38 are provided between the left and right front pillars 31, between the left and right first top frames 26, between the left and right middle bottom frames 32, and the like. Some of the width direction connecting frames 38 are illustrated in FIG. 1.

Each of the components of the off-road vehicle 10 is directly or indirectly supported relative to the above-mentioned mainframe 20.

For example, the seat 70 may directly or indirectly be supported on the middle bottom frames 32. A space to rest the feet in a space for the driver P located forward of the seat 70 may be formed as a footrest space Sf that widens downward as the footrest space Sf extends forward along the above-mentioned front portions 23*f*. For example, a floorboard may be disposed along the front portions 23*f* in side view and supported by the front portions 23*f* to form the above-mentioned space Sf around the feet. In this case, the floorboard may partially have recesses or slits to avoid the middle bottom frames 32 at positions where the middle bottom frames 32 are located.

The seat 70 is located above the intermediate portions 23*m* and 24*m* at a position where the seat 70 overlaps the intermediate portions 23*m* and 24*m* in the fore-aft direction. The seat 70 can thus easily be disposed at a high position to raise a viewpoint. An obstacle forward of the front wheels can thus easily be viewed from the driver's seat.

The motor 80 is supported at a position above the bottom frame 22. When viewed from a side, the bottom frame 22 is disposed not beside and above the motor 80 but below the motor 80. As for the fore-aft direction, the motor 80 may be disposed at a position corresponding to any one of the intermediate portions 23*m*, rear parts of the front portions 23*f*, and front parts of the rear portions 23*r*. In the present embodiment, an upper end portion of the motor 80 is disposed at a position higher than a seating surface 71*af* of the driver's seat 71. A lower end portion of the motor 80 may be disposed at a position higher than the seating surface 71*af* of the driver's seat 71. The motor 80 is disposed at a high position, so that the intermediate portions of the bottom frame 22 are easily arranged at high positions. The motor 80 may directly or indirectly be supported by the bottom frame 22. The motor 80 may directly or indirectly be supported by the rear pillars 33 and the additional frames 36.

When viewed in plan view, the motor 80 may be supported by the mainframe 20 with a direction of the length thereof being along the fore-aft direction. For example, when the motor 80 is an inline engine, the inline engine may be supported by the mainframe 20 with a direction in which cylinders are arranged being along the fore-aft direction. This reduces an installation width of an internal combustion engine, so that the internal combustion engine can easily be incorporated between left and right parts of the mainframe 20.

Each of the components of the off-road vehicle 10 is sometimes fixed to the mainframe 20 directly by screwing, welding, or the like and can be fixed to the mainframe 20 via a bracket or an intermediate member.

A cargo bed, a container, or a bracket to support an object carried by the off-road vehicle 10 may be supported by the mainframe 20. For example, a fixing structure to fix a spare tire may be applied to the cargo bed.

A frame structure of the mainframe 20 is not limited to that in the above-mentioned example and is only required to be designed in response to layout of the components of the off-road vehicle 10 and various stiffness and design requests.

The off-road vehicle 10 may include a door 90. The door 90 may be a plate-like member formed of resin or metal. The door 90 is located outside the driver's seat 71 in the cross-car direction. For example, the door 90 is located in a region between the front pillars 31 and the rear pillars 33 in the fore-aft direction and is located outside the driver's seat 71. For example, a front end of the door 90 is only required to be directly or indirectly supported by a front pillar 31 so that the door 90 is openable.

The bottom frame 22 is only required to include a portion that is located below and apart from a lower end of the door 90. Thus, the bottom frame 22 is protected by the door 90, and deformation of the door 90 is suppressed. An edge of the lower end of the door 90 may be bent to be convex upward. The edge of the lower end of the door 90 may be bent in response to bent shapes of the intermediate portions 23*m* and 24*m* of the bottom frame 22, for example.

In the present embodiment, the edge of the lower end of the door 90 extends above the first bottom frame portions 23 along the first bottom frame portions 23. That is to say, the edge of the lower end of the door 90 include a portion that is bent along the intermediate portions 23*m* and extends linearly along the front portions 23*f* and the rear portions 23*r*. The first bottom frame portions 23 may cover the edge of the lower end of the door 90 from below.

The edge of the lower end of the door 90 is along the first bottom frame portions 23 to easily increase an opening area when the door 90 is opened. In particular, a portion forward of the seat portion 71*a* can be opened wide downward as the portion extends forward. This facilitates stepping-in and -out of the driver P during entry and exit.

The off-road vehicle 10 may include a cover, other than the door 90 and the roof 92 described above, that covers the mainframe 20 or the components supported by the mainframe 20. For example, the off-road vehicle 10 may include a cover that covers the motor 80, the front pillars 31, or the like.

The suspensions 40F and 40R will be described.

The front suspension 40F includes front arms 41F. The front arms 41F are pivotally supported by the mainframe 20 and support the front wheels 60F.

More specifically, the front arms 41F are elongated members. The front arms 41F extend linearly. The front arms 41F may be bent along their paths and, for example, may be bent to be arcuate. Rear end portions of the front arms 41F are pivotally supported by the mainframe 20. Front end portions of the front arms 41F support the front wheels. For example, the rear end portions of the front arms 41F are pivotally supported by a width direction connecting frame 38 that connects the left and right middle bottom frames 32. The front arms 41F are provided for respective left and right wheels. In the present embodiment, the front arms are inclined downward as the front arms extend from the rear end portions to front ends thereof.

The front arms 41F are provided on the opposite sides in the cross-car direction. In the present embodiment, power can be transferred to the left and right front wheels 60F via the rigid axle 68F. The rigid axle 68F extends horizontally in the cross-car direction in a standard state in which the wheels 60F and 60R are in contact with the flat road surface. The rigid axle 68F is connected to a front end of the front drive shaft 50F at a middle position in the cross-car direction of a vehicle body. The rigid axle 68F distributes and transfers power transferred from the front drive shaft 50F to the left and right front wheels 60F. The rigid axle 68F is provided pivotally around a rigid axis line X1 that is located at a position where the rigid axle 68F is connected to the front drive shaft 50F and extends in the fore-aft direction. The left and right front wheels 60F are connected via the rigid axle 68F to perform ganged operation like a seesaw. Specifically, when one front wheel 60F moves upward around the rigid axis line X1, the other front wheel 60F moves downward around the rigid axis line X1.

Opposite end portions in the cross-car direction of the rigid axle 68F are supported on the front ends of the left and right front arms 41F. The left and right front arms 41F are connected to the mainframe 20 via a pair of left and right front shock absorbers 43F. Displacement around the rigid axis line X1 of the left and right front arms 41F is mitigated by the front shock absorbers 43F. The left and right front wheels 60F are supported to be vertically movable in conjunction with each other as described above.

The front arms 41F are lowered as the front arms 41F extend forward. In the present embodiment, the front arms 41F are connected to the mainframe 20 via the front shock absorbers 43F. Stretchability of the front shock absorbers 43F is appropriately adjusted, so that the front arms 41F are lowered as the front arms 41F extend forward.

More specifically, the front suspension 40F includes the above-mentioned front shock absorbers 43F in the present embodiment. The front shock absorbers 43F include dampers and springs. The dampers are vibration attenuating apparatuses that attenuate vibrations and include combinations of cylinders, for example. For example, the springs are arranged around outer peripheries of the dampers.

Upper ends of the front shock absorbers 43F are supported by the mainframe 20 at positions rearward of and higher than the rotational axis 60Fa. For example, the upper ends of the front shock absorbers 43F are supported by portions of the above-mentioned front frames 32*a* closer to rear ends thereof. The front shock absorbers 43F extend from the supported portions at the upper ends diagonally downward and forward and are connected to the front arms 41F. The front shock absorbers 43F are connected to the front arms 41F at positions above lower ends of the front arms 41F.

The supported portions at the upper ends of the front shock absorbers 43F are located rearward of the rotational axis 60Fa of the front wheels 60F and are preferably located rearward of the rigid axle 68F.

The front shock absorbers 43F are thus interposed between the mainframe 20 and the front wheels 60F via the rigid axle 68F and the front arms 41F. By being connected to the front shock absorbers 43F, the front arms 41F are lowered as the front arms 41F extend forward.

Lengths and elastic moduli of the front shock absorbers 43F are set so that the front arms 41F are lowered as the front arms 41F extend forward and can support the front wheels 60F in a resting state in which the weight of the vehicle is supported.

The rear suspension 40R includes rear arms 41R and shock absorbers 43R as with the front suspension 40F. The shock absorbers 43R include dampers and springs.

The rear suspension 40R and the front suspension 40F generally have front-rear symmetric layout.

That is to say, front ends of the rear arms 41R are pivotally supported by a width direction connecting frame 38 that connects the left and right rear pillars 33, for example. Rear ends of the rear arms 41R are connected to a rigid axle 68R that connects the left and right rear wheels 60R as with the front arms 41F. The rear arms 41R extend linearly but may be bent along their paths. In the present embodiment, the rear arms 41R are provided on the opposite sides in the cross-car direction. In the present embodiment, power can be transferred to the left and right rear wheels 60R via the rigid axle 68R. The rigid axle 68R extends horizontally in the cross-car direction in the standard state in which the wheels 60F and 60R are in contact with the flat road surface. The rigid axle 68R is connected to a rear end of the rear drive shaft 50R at a middle position in the cross-car direction of the vehicle body. The rigid axle 68R distributes and transfers power transferred from the rear drive shaft 50R to the left and right rear wheels 60R. The rigid axle 68R is provided pivotally around a rigid axis line X2 that is located at a position where the rigid axle 68R is connected to the rear drive shaft 50R and extends in the fore-aft direction. The left and right rear wheels 60R are connected via the rigid axle 68R to perform ganged operation like a seesaw. Specifically, when one rear wheel 60R moves upward around the rigid axis line X2, the other rear wheel 60R moves downward around the rigid axis line X2.

Opposite end portions in the cross-car direction of the rigid axle 68R are supported on the rear ends of the left and right rear arms 41R. The left and right rear arms 41R are connected to the mainframe 20 via a pair of left and right rear shock absorbers 43R. Displacement around the rigid axis line X2 of the left and right rear arms 41R is mitigated by the rear shock absorbers 43R. The rear ends of the rear arms 41R can be pivoted to vertically move around the front ends as described above. The left and right rear wheels 60R are thus supported to be vertically movable in conjunction with each other by the rear arms 41R via the rigid axle 68R.

Upper ends of the rear shock absorbers 43R are supported by the mainframe 20 at positions forward of and higher than the rotational axis 60Ra of the rear wheels 60R. For example, the upper ends of the rear shock absorbers 43R are supported by portions of the second top frames 27 closer to rear ends thereof. The supported portions at the upper ends of the rear shock absorbers 43R are located forward of the rotational axis 60Ra of the rear wheels 60R and are preferably located forward of the rigid axle 68R.

The rear shock absorbers 43R extend from the supported portions at the upper ends diagonally downward and rearward and are connected to intermediate portions in a longitudinal direction of the rear arms 41R, for example, portions of the rear arms 41R closer to the rear ends thereof. The rear suspension 40R is located above the rear arms 41R.

The rear arms 41R that are pivotally supported by the mainframe 60 and support the rear wheels 60R can thus be lowered as the rear arms 41R extend rearward. The shock absorbers 43R that include the springs are connected to the mainframe 20 at positions forward of the rear rotational axis 60Ra and can be lowered as the shock absorbers 43R extend rearward.

The rear shock absorbers 43R are thus interposed between the mainframe 20 and the rear wheels 60R via the rigid axle 68R. The rigid axle 68R is supported while being suspended by the rear suspension 40R, so that the rear arms 41R are lowered as the rear arms 41R extend rearward.

A vehicle body frame and the vehicle body illustrated as the mainframe 20 are preferably open upward in projected regions of the front wheels 60F and the rear wheels 60R in the vertical direction.

For example, in plan view, the mainframe 20 is located to avoid the front wheels 60F and the rear wheels 60R. If a cover is attached to the mainframe 20, the cover is located to avoid the front wheels 60F and the rear wheels 60R in plan view. That is to say, a cover that covers the front wheels 60F or the rear wheels 60R is not provided. In other words, the vehicle has open spaces from which the front wheels and the rear wheels are exposed upward when viewed from above.

The front wheels 60F and the rear wheels 60R are thus prevented from interfering with the mainframe 20 and the like and can vertically move. Furthermore, the driver P seated on the driver's seat 71 easily views the ground on which the front wheels 60F are to travel.

A diameter of each of the rear wheels 60R is set so that an upper end L2 of each of the rear wheels 60R is located above a position L1 of the seating surface 71*af* of the seat portion 71*a*. That is to say, rear wheels each having a diameter greater than the height of the position L1 of the seating surface 71*af* of the seat portion 71*a* are selected as the rear wheels 60R.

A diameter of each of the front wheels 60F is preferably set so that an upper end of each of the front wheels 60F is located above the position L1 of the seating surface 71*af* of the seat portion 71*a*. That is to say, front wheels each having a diameter greater than the height of the position L1 of the seating surface 71*af* of the seat portion 71*a* are preferably selected as the front wheels 60F.

As described above, the front wheels 60F are supported on the opposite ends in the cross-car direction of the rigid axle 68F. The front wheels 60F are preferably supported relative to the rigid axle 68F via a portal axle 100 structure.

In the portal axle 100 structure, a rotational axis 68Fa of the front rigid axle 68F is disposed above the rotational axis 60Fa of the front wheels 60F as illustrated in FIGS. 3 and 4.

Specifically, the portal axle 100 structure includes a first gear 102 that is coaxially connected to the front rigid axle 68F and is rotated together with the rigid axle 68F and a second gear 104 that is coaxially connected to the front wheels 60F and is rotated together with the front wheels 60F. The first gear 102 and the second gear 104 are received in a case 110 and are rotatably supported to mesh each other. Rotation of the rigid axle 68F is transferred to the front wheels 60F via the first gear 102 and the second gear 104. The front rigid axle 68F can thus be disposed at a position higher than the rotational axis 60Fa of the front wheels 60F. A position of the rigid axle 68F can thus be raised compared with a case where the rotational axis 60Fa of the wheels is located as an extension of the rotational axis 68Fa of the rigid axle 68F.

The first gear 102 and the second gear 104 described above may be set to have a gear ratio with which they mesh each other without changing a rotational speed or may be set to have a gear ratio with which the rotational speed is increased or decreased.

Similarly, the rear wheels 60R may be supported relative to the rear rigid axle 68R using the portal axle 100 structure.

The front wheels 60F and the rear wheels 60R are preferably wheels suitable for travel on rough terrain. As described above, the front wheels 60F and the rear wheels 60R each preferably have a diameter that is as large as possible. The front wheels 60F and the rear wheels 60R may be low pressure tires, in other words, balloon tires. The low pressure tires are tires that are assumed to be filled with air at an upper limit of 40 kPa or less, for example. Use of the low pressure tires allows for deformation of the tires in response to unevenness of the road surface to increase the area of contact between the wheels and the contact surface. Air non-filled wheels including elastically deformed spokes may be used as the front wheels and the rear wheels.

The front wheels 60F are supported by the front suspension 40F at positions forward of and away from the front ends of the first bottom frame portions 23 and the second bottom frame portions 24. The rear wheels 60R are supported by the rear suspension 40R at positions rearward of and away from the rear ends of the first bottom frame portions 23 and the second bottom frame portions 24.

The front portions 23*f* and 24*f* and the rear portions 23*r* and 24*r* of the bottom frame 22 are preferably located above and D1 away from the rotational axis 60Fa of the front wheels 60F and the rotational axis 60Ra of the rear wheels 60R in the vertical direction. The front portions 23*f* and 24*f* and the rear portions 23*r* and 24*r* of the bottom frame 22 are preferably located between the rotational axis 60Fa and the rotational axis 60Ra away from the rotational axis 60Fa and the rotational axis 60Ra in the fore-aft direction.

The front drive shaft 50F and the rear drive shaft 50R will be described.

For example, a gear mechanism 62 is integrated with the motor 80. The front drive shaft 50F extends forward from the gear mechanism 62, and the rear drive shaft 50R extends rearward from the gear mechanism 62. Rotation of the motor 80 is shifted by the gear mechanism 62 and is then transferred to the front drive shaft 50F and the rear drive shaft 50R.

The front drive shaft 50F extends toward the front rigid axle 68F and is connected to the rigid axle 68F via a gear. The front drive shaft is preferably supported by the mainframe at two or more positions. For example, the front drive shaft may be supported by an axis support that is provided at the front end of the front drive shaft. The front drive shaft 50F extends above the bottom frame 22. The front drive shaft 50F may pass through a space above an occupant floor surface in the fore-aft direction between the left and right occupant's seats 71 and 72. Thus, the motor 80 is easily disposed at a relatively high position, and the bottom frame 22 is easily formed at a high position. For example, the front drive shaft may be disposed in a shaft case disposed between the left and right occupant's seats. In this case, the shaft case is formed in a shape of a tunnel that extends in the fore-aft direction to prevent exposure of the drive shaft to an occupant space. An upper surface of the shaft case as a whole or at least rear portion of the shaft case may be higher than the seating surface of the seat. The front portions of the bottom frame are thus easily arranged at high positions to increase road handling. For example, a case for the front drive shaft may be disposed in a center console disposed between the seats.

The rear drive shaft 50R extends toward the rear rigid axle 68R and is connected to the rigid axle 68R via a gear. The rear drive shaft is preferably supported by the mainframe at two or more positions. For example, the rear drive shaft may be supported by an axis support that is provided at a rear end of the rear drive shaft. The rear drive shaft 50R extends above the bottom frame 22. In the present embodiment, the rear drive shaft 50R extends rearward between the motor 80 and the bottom frame 22 in the vertical direction.

The front drive shaft 50F and the rear drive shaft 50R extend from the gear mechanism 62 at positions higher than the rigid axles 68F and 68R. The front drive shaft 50F is thus lowered as the front drive shaft 50F extends forward. The rear drive shaft 50R is lowered as the rear drive shaft 50R extends rearward.

The front portions 23*f* and 24*f* of the bottom frame 22 are inclined in the same direction as the front drive shaft 50F. The rear portions 23*r* and 24*r* are inclined in the same direction as the rear drive shaft 50R.

In the cross-car direction, the drive shafts 50F and 50R may each be located at a middle position in the cross-car direction relative to the vehicle body, may each be located to the right or to the left of the middle position, or may each be located directly above the right or left front arm 41F or the right or left rear arm 41R.

The bottom frame 22 is located below the front drive shaft 50F and the rear drive shaft 50R. That is to say, when a cross section perpendicular to the fore-aft direction is observed at each position in the fore-aft direction, a lowermost end of the bottom frame 22 is lower than the front drive shaft 50F and the rear drive shaft 50R.

In the present embodiment, in the above-mentioned cross section, a lowermost end of the second bottom frame 24 is lower than the front drive shaft 50F and the rear drive shaft 50R.

The front drive shaft 50F may be inclined at an angle parallel to or at an angle close to the angle parallel to the front portions 23*f* and 24*f* of the bottom frame 22. For example, in side view, the front drive shaft 50F may form an angle of ±10° and may preferably form an angle of ±5° relative to the front portions 23*f* and 24*f*.

The rear drive shaft 50R may be inclined at an angle parallel to or at an angle close to the angle parallel to the rear portions 23*r* and 24*r* of the bottom frame 22. For example, in side view, the rear drive shaft 50R may form an angle of ±10° and may preferably form an angle of ±5° relative to the rear portions 23*r* and 24*r*.

An angle of inclination of each of the front drive shaft 50F and the rear drive shaft 50R is assumed to be an angle in the resting state.

According to the off-road vehicle 10 having a configuration as described above, the front portions 23*f* and 24*f* of the bottom frame 22 are lowered as the front portions 23*f* and 24*f* extend forward, and the rear portions 23*r* and 24*r* of the bottom frame 22 are lowered as the rear portions 23*r* and 24*r* extend rearward. A minimum ground height of an intermediate portion in the fore-aft direction of the off-road vehicle 10 can thus be increased compared with a case where the bottom frame 22 extends along a horizontal plane. If a raised portion of rough terrain or a protruding object, such as rock, is present between the front wheels 60F and the rear wheels 60R when the off-road vehicle travels on the rough terrain, the bottom frame 22 is less likely to be in contact with the object on the rough terrain. Furthermore, the front drive shaft 50F is lowered as the front drive shaft 50F extends forward, and the rear drive shaft 50R is lowered as the rear drive shaft 50R extends rearward. The front drive shaft 50F and the rear drive shaft 50R are thus also less likely to be in contact with the object on the rough terrain when the off-road vehicle 10 travels on the rough terrain. Road handling of the off-road vehicle 10 is thus increased.

The bottom frame 22 includes the front portions 23*f* and 24*f* that are inclined in the same direction as the front drive shaft 50F and the rear portions 23*r* and 24*r* that are inclined in the same direction as the rear drive shaft 50R. Furthermore, the bottom frame 22 is located below the front drive shaft 50F and the rear drive shaft 50R. Contact between the object on the rough terrain and each of the front drive shaft 50F and the rear drive shaft 50R is thus suppressed by the bottom frame 22, and the bottom frame 22 easily protects each of the drive shafts 50F and 50R. Inclination of the front portions 23*f* and 24*f* and the rear portions 23*r* and 24*r* of the bottom frame 22 is thus easily set to be large while interference between the bottom frame 22 and the drive shafts 50F and 50R is prevented. When the front portions 23*f* and 24*f* and the rear portions 23*r* and 24*r* of the bottom frame 22 are largely inclined, the bottom frame 22 is less likely to be in contact with the object on the rough terrain. Road handling of the off-road vehicle 10 is thus increased.

The bottom frame 22 includes the first bottom frame portions 23 that are located below and apart from the lower end of the door 90. Contact of the object with the lower end of the door 90 can thus be prevented by the bottom frame. The door 90 is less likely to be deformed and broken and is likely to be maintained openable.

The bottom frame 22 includes the first bottom frame portions 23 and the second bottom frame portions 24 that are located outside the first bottom frame portions 23 in the cross-car direction. The first bottom frame portions 23 and the second bottom frame portions 24 are provided on the opposite sides in the cross-car direction, so that a load when the bottom frame 22 is in contact with an obstacle is likely to be distributed.

The second bottom frame portions 24 that are located outside the first bottom frame portions 23 in the cross-car direction are lower than the first bottom frame portions 23, so that contact of an object with the first bottom frame portions 23 is likely to be avoided by the second bottom frame portions 24. That is to say, contact of the object with a portion closer to the middle in the cross-car direction of the mainframe 20 is avoided.

The front portions 23*f* and 24*f* and the rear portions 23*r* and 24*r* extend linearly, and the intermediate portions 23*m* and 24*m* are bent to be convex upward between the front portions 23*f* and 24*f* and the rear portions 23*r* and 24*r*, so that a ground height of the intermediate portions 23*m* and 24*m* is easily set to be large.

The footrest space Sf that widens downward as the footrest space Sf extends forward is formed along the front portions 23*f* and 24*f*, so that the space to rest the feet of an occupant is likely to be secured.

The mainframe 20 includes, on the opposite sides in the cross-car direction, the first top frames 26 and the second top frames 27 that are located outside the first top frames 26 in the cross-car direction, and the second top frames 27 are lower than the first top frames 26. The off-road vehicle 10 can thus easily be recovered in a roll direction even if the off-road vehicle 10 turns over. The first top frames 26 and the second top frames 27 easily protect an inner space of the first top frames 26 and the second top frames 27.

The mainframe 20 includes the connecting portions 28 that connect the first top frames 26 and the second top frames 27 to form the truss structure, so that stiffness of a top portion of the mainframe 20 can be increased while visibility is improved.

The first top frames 26 and the second top frames 27 are each arcuate to be convex upward in side view, so that the off-road vehicle 10 is easily recovered in a pitch direction even if the off-road vehicle 10 turns over.

The front arms 41F are lowered as the front arms 41F extend forward, and the rear arms 41R are lowered as the rear arms 41R extend rearward, so that portions of the front arms 41F and the rear arms 41R located closer to intermediate portions of the front wheels 60F and the rear wheels 60R are less likely to be in contact with an object on the rough terrain. Road handling of the off-road vehicle 10 is thus further increased.

The front shock absorbers 43F are connected to the mainframe 20 at positions rearward of the front rotational axis 60Fa and are lowered as the front shock absorbers 43F extend forward. The rear shock absorbers 43R are connected to the mainframe 20 at positions forward of the rear rotational axis 60Ra and are lowered as the rear shock absorbers 43R extend rearward. The front shock absorbers 43F and the rear shock absorbers 43R are thus less likely to interfere with the front wheels 60F and the rear wheels 60R and further the rigid axle 68F and the rigid axle 68R that respectively support the front wheels 60F and the rear wheels 60R and the like even when the front wheels 60F and the rear wheels 60R are significantly vertically moved. Road handling of the off-road vehicle 10 can thus further be increased by increasing the amount of vertical movement of the front wheels 60F and the rear wheels 60R.

Arrangement of the mainframe 20 and the like above the front wheels 60F and the rear wheels 60R is avoided, so that the projected regions of the front wheels 60F and the rear wheels 60R in the vertical direction are open upward. Road handling of the off-road vehicle 10 can thus further be increased by increasing the amount of vertical movement of the front wheels 60F and the rear wheels 60R.

When the wheels 60F and 60R are supported on opposite ends of the rigid axles 68F and 68R via the portal axles 100, the rotational axes 68Fa and 68Ra of the rigid axles 68F and 68R can be arranged above the rotational axes 60Fa and 60Ra of the wheels 60F and 60R, so that the rigid axles 68F and 68R are less likely to be in contact with an object on the rough terrain, and road handling of the off-road vehicle 10 can further be increased.

The seat 70 is located above the intermediate portions 23*m* and 24*m* at a position where the seat 70 overlaps the intermediate portions 23*m* and 24*m* in the fore-aft direction, so that the seat 70 is easily disposed at a high position to provide good visibility.

The rear wheels 60R are increased in size to the extent that the upper ends of the rear wheels 60R are located above the seating surface 71*af*, so that road handling is further increased.

Furthermore, the front portions 23*f* and 24*f* and the rear portions 23*r* and 24*r* of the bottom frame 22 are located above and away from the front rotational axis 60Fa and the rear rotational axis 60Ra in the vertical direction. Furthermore, they are located between the rotational axis 60Fa and the rotational axis 60Ra away from the rotational axis 60Fa and the rotational axis 60Ra in the fore-aft direction. A front end or a rear end of the bottom frame 22 is thus less likely to be in contact with an object on the rough terrain even when the front wheels 60F and the rear wheels 60R are significantly vertically moved relative to the bottom frame 22.

In the present embodiment, front ends of the front shock absorbers 43F may directly be connected to the rigid axle 68F. Rear ends of the rear shock absorbers 43R may directly be connected to the rigid axle 68R.

In the present embodiment, an example in which the off-road vehicle is the four-wheel-drive vehicle has been described. The off-road vehicle may be a two-wheel-drive vehicle. When the off-road vehicle is a rear-wheel-drive vehicle, the drive shaft extends rearward from the motor. When the off-road vehicle is a front-wheel-drive vehicle, the drive shaft extends forward from the motor.

In the present embodiment, an example in which a single motor 80 drives both the front wheels 60F and the rear wheels 60R has been described. The front wheels 60F and the rear wheels 60R may be driven by separate motors. For example, the front wheels or the rear wheels may be driven by a first motor, and the other wheels maybe driven by a second motor. For example, the first motor transfers power to the front wheels or the rear wheels via the drive shaft. The second motor may transfer power to the other wheels not via the drive shaft. The second motor may be an in-wheel motor or may be disposed between the other left and right wheels and transfer power not via the drive shaft.

A hybrid motor obtained by combining an internal combustion engine and an electric drive motor may be used as a motor that drives both the front wheels and the rear wheels or a motor that drives the front wheels or the rear wheels.

When the internal combustion engine is used as the motor, the motor may have a structure in which a crankshaft extends along the fore-aft direction or a structure in which the crankshaft extends along the cross-car direction. When a longitudinal direction of the motor is along the cross-car direction, a dimension in the fore-aft direction of the vehicle is easily reduced. In this case, the motor is preferably disposed close to the seat. This can prevent interference between the motor and the rear drive shaft, facilitate disposition of the rear drive shaft at a high position, and improve road handling.

When the longitudinal direction of the motor is along the fore-aft direction, the motor is preferably disposed offset from the rear drive shaft in the cross-car direction. This can prevent interference between the motor and the rear drive shaft. The motor may be formed to be concave upward in a portion facing the rear drive shaft. This can also prevent interference between the motor and the rear drive shaft.

When the longitudinal direction of the motor is along the fore-aft direction, the motor may be disposed so that a front end of the motor protrudes forward of a rear surface of the backrest of the seat. Specifically, a front end portion of the motor may be located between the left and right seats in the cross-car direction and in a space forward of the backrest. A rear end portion of the motor can thus be located forward to prevent interference between the motor and the rear drive shaft.

The rigid axles 68F and 68R may respectively support the front wheels 60F and the rear wheels 60R not via the portal axles 100. For example, a normal axle support structure in which a rigid axle supports wheels with a rotational axis of the rigid axle and a rotational axis of the wheels matching each other may be used.

The front wheels 60F or the rear wheels 60R may be supported by another suspension, for example, an independent suspension. An independent suspension scheme may be a structure in which arms independently support wheels without using a rigid axle, for example.

Configurations described in the above-mentioned embodiment and modifications can be combined with each other as appropriate unless any contradiction occurs.

The present application discloses various aspects below.

An off-road vehicle according to a first aspect is an off-road vehicle including: a mainframe that supports a motor; a front wheel; a rear wheel; a front suspension that supports the front wheel relative to the mainframe; a rear suspension that supports the rear wheel relative to the mainframe; a front drive shaft that transfers rotation of the motor to the front wheel; and a rear drive shaft that transfers rotation of the motor to the rear wheel, wherein the mainframe includes a bottom frame that extends in a fore-aft direction, the bottom frame includes an intermediate portion that is located between the front wheel and the rear wheel, a front portion that extends forward from the intermediate portion, and a rear portion that extends rearward from the intermediate portion, the front portion being lowered as the front portion extends forward, the rear portion being lowered as the rear portion extends rearward, the front drive shaft is lowered as the front drive shaft extends forward, and the rear drive shaft is lowered as the rear drive shaft extends rearward.

According to the off-road vehicle, the front portion of the bottom frame is lowered as the front portion extends forward, and the rear portion of the bottom frame is lowered as the rear portion extends rearward. The bottom frame is thus less likely to be in contact with an object on rough terrain when the off-road vehicle travels on the rough terrain. The front drive shaft is lowered as the front drive shaft extends forward, and the rear drive shaft is lowered as the rear drive shaft extends rearward. The front and rear drive shafts are thus also less likely to be in contact with an object on the rough terrain when the off-road vehicle travels on the rough terrain. Road handling of the off-road vehicle is thus increased.

A second aspect is the off-road vehicle according to the first aspect, wherein the bottom frame includes a portion that is inclined in the same direction as the front drive shaft and a portion that is inclined in the same direction as the rear drive shaft, the bottom frame being located below the front drive shaft and the rear drive shaft.

In this case, the bottom frame easily protects each of the drive shafts. Inclination of the bottom frame is easily set to be large while interference with the drive shafts is prevented. When the bottom frame is largely inclined, the bottom frame is less likely to be in contact with an object on the rough terrain. Road handling of the off-road vehicle is thus increased.

A third aspect is the off-road vehicle according to the first or the second aspect, further including a driver's seat that is supported by the mainframe; and a door that is located outside the driver's seat in a cross-car direction, wherein the bottom frame includes a portion that is located below and apart from a lower end of the door.

Contact of an object with the lower end of the door can thus be prevented by the bottom frame. The door is thus likely to be maintained openable.

A fourth aspect is the off-road vehicle according to any one of the first to the third aspects, wherein the bottom frame includes, on each side in a cross-car direction, a first bottom frame portion that extends in the fore-aft direction and a second bottom frame portion that extends in the fore-aft direction outside the first bottom frame portion in the cross-car direction, and the second bottom frame portion is lower than the first bottom frame portion.

The first bottom frame portion and the second bottom frame portion are provided on each side in the cross-car direction, so that a load when the bottom frame is in contact with an obstacle is likely to be distributed.

A fifth aspect is the off-road vehicle according to any one of the first to the fourth aspects, wherein the front portion extends linearly, and the rear portion extends linearly, and the intermediate portion is a portion that is bent to be convex upward between the front portion and the rear portion.

The front portion and the rear portion extend linearly, and the intermediate portion is bent to be convex upward between the front portion and the rear portion, so that a ground height of the intermediate portion is easily set to be large.

A sixth aspect is the off-road vehicle according to the fifth aspect, wherein a footrest space is formed along the front portion, the footrest space widening downward as the footrest space extends forward.

The space to rest the feet of an occupant is thus likely to be secured.

A seventh aspect is the off-road vehicle according to any one of the first to the sixth aspects, wherein the mainframe includes, on each side in a cross-car direction, a first top frame that extends in the fore-aft direction and a second top frame that extends in the fore-aft direction outside the first top frame in the cross-car direction, and the second top frame is lower than the first top frame.

In this case, the second top frame outside the first top frame in the cross-car direction is lower than the first top frame, so that the off-road vehicle can easily be recovered in a roll direction even if the off-road vehicle turns over. The first top frame and the second top frame easily protect an inner space of the first top frame and the second top frame.

An eighth aspect is the off-road vehicle according to the seventh aspect, wherein the mainframe includes a connecting portion that connects the first top frame and the second top frame to form a truss structure.

Stiffness of a top portion of the mainframe can thus be increased while visibility is improved.

A ninth aspect is the off-road vehicle according to the seventh or the eighth aspect, wherein the first top frame and the second top frame are each arcuate to be convex upward in side view.

The off-road vehicle is thus easily recovered in a pitch direction even if the off-road vehicle turns over.

A tenth aspect is the off-road vehicle according to any one of the first to the ninth aspects, wherein the front suspension includes a front arm that is pivotally supported by the mainframe and supports the front wheel, the rear suspension includes a rear arm that is pivotally supported by the mainframe and supports the rear wheel, the front arm is lowered as the front arm extends forward, and the rear arm is lowered as the rear arm extends rearward.

Portions of the front arm and the rear arm located closer to intermediate portions of the front wheel and the rear wheel are thus less likely to be in contact with an object on the rough terrain. Road handling of the off-road vehicle is thus further increased.

An eleventh aspect is the off-road vehicle according to any one of the first to the tenth aspects, wherein the front suspension includes a front shock absorber that is interposed between the mainframe and the front wheel, the rear suspension includes a rear shock absorber that is interposed between the mainframe and the rear wheel, the front shock absorber is connected to the mainframe at a position rearward of a rotational axis of the front wheel and is lowered as the front shock absorber extends forward, and the rear shock absorber is connected to the mainframe at a position forward of a rotational axis of the rear wheel and is lowered as the rear shock absorber extends rearward.

The front shock absorber and the rear shock absorber are thus less likely to interfere with the front wheel and rear wheel and further portions that support the front wheel and the rear wheel even when the front wheel and the rear wheel are significantly vertically moved. Road handling of the off-road vehicle can thus further be increased by increasing the amount of vertical movement of the front wheel and the rear wheel.

A twelfth aspect is the off-road vehicle according to any one of the first to the eleventh aspects, wherein projected regions of the front wheel and the rear wheel in a vertical direction are open upward.

Road handling of the off-road vehicle can thus further be increased by increasing the amount of vertical movement of the front wheel and the rear wheel.

A thirteenth aspect is the off-road vehicle according to any one of the first to the twelfth aspects, further including a portal axle that is used to dispose an axle above a rotational axis of the front wheel or the rear wheel.

The axle can thus be disposed above the rotational axis of the front wheel or the rear wheel, so that the axle is less likely to be in contact with an object on the rough terrain, and road handling of the off-road vehicle can further be increased.

A fourteenth aspect is the off-road vehicle according to any one of the first to the thirteenth aspects, further including a seat that is located above the intermediate portion at a position where the seat overlaps the intermediate portion in the fore-aft direction.

The seat is thus easily disposed at a high position to provide good visibility.

A fifteenth aspect is the off-road vehicle according to any one of the first to the fourteenth aspects, further including a seat that includes a seating surface, wherein an upper end of the rear wheel is located above the seating surface.

In this case, the rear wheel is so large that the upper end of the rear wheel is located above the seating surface to further increase road handling.

A sixteenth aspect is the off-road vehicle according to any one of the first to the fifteenth aspects, wherein the front portion and the rear portion of the bottom frame are located above and away from a front rotational axis of the front wheel and a rear rotational axis of the rear wheel in a vertical direction and are located between the front rotational axis and the rear rotational axis away from the front rotational axis and the rear rotational axis in the fore-aft direction.

In this case, a front end or a rear end of the bottom frame is less likely to be in contact with an object on the rough terrain even when the front wheel and the rear wheel are significantly vertically moved relative to the bottom frame.

An off-road vehicle according to a seventeenth aspect is an off-road vehicle including: a mainframe that supports a motor; a front wheel; a rear wheel; a front suspension that supports the front wheel relative to the mainframe; and a rear suspension that supports the rear wheel relative to the mainframe, wherein the mainframe includes a bottom frame that extends in a fore-aft direction, the bottom frame includes an intermediate portion that is located between the front wheel and the rear wheel, a front portion that extends forward from the intermediate portion, and a rear portion that extends rearward from the intermediate portion, the front portion being lowered as the front portion extends forward, the rear portion being lowered as the rear portion extends rearward, and the front portion and the rear portion of the bottom frame are located above and away from a front rotational axis of the front wheel and a rear rotational axis of the rear wheel in a vertical direction and are located between the front rotational axis and the rear rotational axis away from the front rotational axis and the rear rotational axis in the fore-aft direction.

According to the off-road vehicle, a front end or a rear end of the bottom frame is less likely to be in contact with an object on the rough terrain even when the front wheel and the rear wheel are significantly vertically moved relative to the bottom frame.

An off-road vehicle according to an eighteenth aspect is an off-road vehicle including: a mainframe that supports a motor; a front wheel; a rear wheel; a front suspension that supports the front wheel relative to the mainframe; a rear suspension that supports the rear wheel relative to the mainframe; and a drive shaft that transfers rotation of the motor to at least one of the front wheel and the rear wheel, wherein the mainframe includes a bottom frame that extends in a fore-aft direction, the bottom frame includes an intermediate portion that is located between the front wheel and the rear wheel, a front portion that extends forward from the intermediate portion, and a rear portion that extends rearward from the intermediate portion, the front portion being lowered as the front portion extends forward, the rear portion being lowered as the rear portion extends rearward, and the drive shaft is lowered as the drive shaft extends outward away from the intermediate portion in the fore-aft direction.

According to the off-road vehicle, the front portion of the bottom frame is lowered as the front portion extends forward, and the rear portion of the bottom frame is lowered as the rear portion extends rearward. The bottom frame is thus less likely to be in contact with an object on the rough terrain when the off-road vehicle travels on the rough terrain. The drive shaft is lowered as the drive shaft extends outward away from the intermediate portion in the fore-aft direction. The drive shaft is also less likely to be in contact with an object on the rough terrain when the off-road vehicle travels on the rough terrain. Road handling of the off-road vehicle is thus increased.

The foregoing description is in all aspects illustrative and not restrictive. It is therefore understood that numerous unillustrated modifications can be devised without departing from the scope of the invention.

The invention claimed is:

1. An off-road vehicle comprising:

a mainframe that supports a motor;

a front wheel;

a rear wheel;

a seat;

a front suspension that supports the front wheel relative to the mainframe;

a rear suspension that supports the rear wheel relative to the mainframe;

a front drive shaft that transfers rotation of the motor to the front wheel; and a rear drive shaft that transfers rotation of the motor to the rear wheel, wherein the mainframe includes a bottom frame that extends in a fore-aft direction, the bottom frame includes an intermediate portion that is located between the front wheel and the rear wheel, a front portion that extends forward from the intermediate portion, and a rear portion that extends rearward from the intermediate portion, the front portion being lowered as the front portion extends forward, the rear portion being lowered as the rear portion extends rearward, the front drive shaft is lowered as the front drive shaft extends forward while extending in the fore-aft direction, and the rear drive shaft is lowered as the rear drive shaft extends rearward while extending in the fore-aft direction, and wherein the motor is located between the seat and the rear wheel in the fore-aft direction, and wherein a lower end portion of the motor is disposed at a position higher than a seating surface of the seat.

2. The off-road vehicle according to claim 1, wherein the bottom frame includes a portion that is inclined in the same direction as the front drive shaft and a portion that is inclined in the same direction as the rear drive shaft, the bottom frame being located below the front drive shaft and the rear drive shaft.

3. The off-road vehicle according to claim 1, further comprising:

a driver's seat that is supported by the mainframe; and a door that is located outside the driver's seat in a cross-car direction, wherein the bottom frame includes a portion that is located below and apart from a lower end of the door.

4. The off-road vehicle according to claim 1, wherein the bottom frame includes, on each side in a cross-car direction, a first bottom frame portion that extends in the fore-aft direction and a second bottom frame portion that extends in the fore-aft direction outside the first bottom frame portion in the cross-car direction, and the second bottom frame portion is lower than the first bottom frame portion.

5. An off-road vehicle comprising:

a mainframe that supports a motor;

a front wheel;

a rear wheel;

a front suspension that supports the front wheel relative to the mainframe;

a rear suspension that supports the rear wheel relative to the mainframe;

a front drive shaft that transfers rotation of the motor to the front wheel; and a rear drive shaft that transfers rotation of the motor to the rear wheel, wherein the mainframe includes a bottom frame that extends in a fore-aft direction, the bottom frame includes an intermediate portion that is located between the front wheel and the rear wheel, a front portion that extends forward from the intermediate portion, and a rear portion that extends rearward from the intermediate portion, the front portion being lowered as the front portion extends forward, the rear portion being lowered as the rear portion extends rearward, the front drive shaft is lowered as the front drive shaft extends forward, and the rear drive shaft is lowered as the rear drive shaft extends rearward, and wherein the front portion extends linearly, and the rear portion extends linearly, and the intermediate portion is a portion that is bent to be convex upward between the front portion and the rear portion.

6. The off-road vehicle according to claim 5, wherein a footrest space is formed along the front portion, the footrest space extending downward as the footrest space extends forward.

7. The off-road vehicle according to claim 1, wherein the mainframe includes, on each side in a cross-car direction, a first top frame that extends in the fore-aft direction and a second top frame that extends in the fore-aft direction outside the first top frame in the cross-car direction, and the second top frame is lower than the first top frame.

8. The off-road vehicle according to claim 7, wherein the mainframe includes a connecting portion that connects the first top frame and the second top frame to form a truss structure.

9. The off-road vehicle according to claim 7, wherein the first top frame and the second top frame are each arcuate to be convex upward in side view.

10. The off-road vehicle according to claim 1, wherein the front suspension includes a front arm that is pivotally supported by the mainframe and supports the front wheel, the rear suspension includes a rear arm that is pivotally supported by the mainframe and supports the rear wheel, the front arm is lowered as the front arm extends forward, and the rear arm is lowered as the rear arm extends rearward.

11. The off-road vehicle according to claim 1, wherein the front suspension includes a front shock absorber that is interposed between the mainframe and the front wheel, the rear suspension includes a rear shock absorber that is interposed between the mainframe and the rear wheel, the front shock absorber is connected to the mainframe at a position rearward of a rotational axis of the front wheel and is lowered as the front shock absorber extends forward, and the rear shock absorber is connected to the mainframe at a position forward of a rotational axis of the rear wheel and is lowered as the rear shock absorber extends rearward.

12. The off-road vehicle according to claim 1, wherein projected regions of the front wheel and the rear wheel in a vertical direction are open upward.

13. The off-road vehicle according to claim 1, further comprising a portal axle that is used to dispose an axle above a rotational axis of the front wheel or the rear wheel.

14. The off-road vehicle according to claim 1, further comprising a seat that is located above the intermediate portion at a position where the seat overlaps the intermediate portion in the fore-aft direction.

15. The off-road vehicle according to claim 1, further comprising a seat that includes a seating surface, wherein an upper end of the rear wheel is located above the seating surface.

16. The off-road vehicle according to claim 1, wherein the front portion and the rear portion of the bottom frame are located above and away from a front rotational axis of the front wheel and a rear rotational axis of the rear wheel in a vertical direction and are located between the front rotational axis and the rear rotational axis away from the front rotational axis and the rear rotational axis in the fore-aft direction.

17. The off-road vehicle according to claim 1, further comprising:

a gear mechanism distributing power back and forth located rearward of the seat.

* * * * *